US009618114B2

(12) United States Patent
Suzumura et al.

(10) Patent No.: US 9,618,114 B2
(45) Date of Patent: Apr. 11, 2017

(54) HYDRAULIC CONTROL SYSTEM FOR VEHICLE

(71) Applicant: TOYOTA JIDOSHA KABUSHIKI KAISHA, Toyota-shi, Aichi (JP)

(72) Inventors: Kyohei Suzumura, Toyota (JP); Shinya Toyoda, Toyota (JP); Kazuya Ishiizumi, Toyota (JP); Akira Hino, Toyota (JP); Sei Kojima, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/773,021

(22) PCT Filed: Jun. 5, 2013

(86) PCT No.: PCT/JP2013/065601
§ 371 (c)(1),
(2) Date: Sep. 4, 2015

(87) PCT Pub. No.: WO2014/136280
PCT Pub. Date: Sep. 12, 2014

(65) Prior Publication Data
US 2016/0017994 A1  Jan. 21, 2016

(30) Foreign Application Priority Data

Mar. 6, 2013  (JP) .................................. 2013-043726

(51) Int. Cl.
*F16H 61/662* (2006.01)
*F16H 61/00* (2006.01)
(Continued)

(52) U.S. Cl.
CPC ..... *F16H 61/66272* (2013.01); *F16D 48/066* (2013.01); *F16H 61/0031* (2013.01);
(Continued)

(58) Field of Classification Search
None
See application file for complete search history.

(56) References Cited

U.S. PATENT DOCUMENTS

| 5,170,868 A * | 12/1992 | Yamashita | ............ F16D 48/066 |
| | | | 192/82 T |
| 2010/0258192 A1* | 10/2010 | Schaufler | ............ F15B 13/0433 |
| | | | 137/1 |
| 2012/0302402 A1* | 11/2012 | Waku | .................. F16H 61/0031 |
| | | | 477/175 |

FOREIGN PATENT DOCUMENTS

| JP | 2001-082594 A | 3/2001 |
| JP | 2008-014362 A | 1/2008 |
| JP | 2011-133012 A | 7/2011 |

* cited by examiner

*Primary Examiner* — Edwin A Young
(74) *Attorney, Agent, or Firm* — Andrews Kurth Kenyon LLP

(57) ABSTRACT

A hydraulic control system for a vehicle having a continuously variable transmission in which a torque transmitting capacity thereof is changed hydraulically, and an engagement device which is connected to the continuously variable transmission in series and in which a torque transmitting capacity thereof is changed hydraulically. The hydraulic control system comprises a selecting means that selects a command pattern for setting an engagement pressure of the engagement device out of a plurality of patterns when an initial pressure is lower than a steady pressure for a normal running of the vehicle. The selecting means is configured to select the command pattern in such a manner that the torque transmitting capacity of the engagement device does not exceeds the torque transmitting capacity of the continuously variable transmission, based on at least any of conditions of the initial pressure that is lowered to be lower than the steady pressure, and a rotational speed of the continuously variable transmission.

10 Claims, 6 Drawing Sheets

(51) Int. Cl.
F16D 48/06 (2006.01)
F16H 61/688 (2006.01)
*F16H 61/66* (2006.01)
*F16H 61/02* (2006.01)

(52) U.S. Cl.
CPC ... *F16H 61/688* (2013.01); *F16D 2500/1026* (2013.01); *F16D 2500/1088* (2013.01); *F16D 2500/10412* (2013.01); *F16D 2500/30426* (2013.01); *F16D 2500/30816* (2013.01); *F16D 2500/30825* (2013.01); *F16D 2500/3101* (2013.01); *F16D 2500/3127* (2013.01); *F16D 2500/50236* (2013.01); *F16D 2500/50858* (2013.01); *F16D 2500/70252* (2013.01); *F16D 2500/70282* (2013.01); *F16D 2500/70406* (2013.01); *F16H 61/0262* (2013.01); *F16H 2061/6618* (2013.01); *F16H 2061/66277* (2013.01)

Fig. 4

| Conditions in the Begining of Hydroulic Pressure when Shifting from N to D or R | | | | | Command Pattern |
|---|---|---|---|---|---|
| Condition of Line Pressure | Condition of Engine | Speed of Secoundary Sheave | Difference between Trubine Speed and Pulley Speed | Brake Demand Road Gradient | |
| Pressure is Insufficient | - | - | - | - | A |
| Pressure is Ready | Engine is Required to be Stopped | - | - | - | B |
| | Engine is Restarted | - | - | - | |
| | Engine is Stopped by S&S Control | Higher than Reference Speed | - | - | |
| | | Lower than Reference Speed | Lower than Predetermined Speed | - | |
| | | | Smaller than Predetermied Value | Braske SW = OFF and On Flat Road | C |
| | | | | Braske SW = ON or Road is not Flat | D |

# HYDRAULIC CONTROL SYSTEM FOR VEHICLE

CROSS-REFERENCE TO RELATED APPLICATIONS

This is a national phase application based on the PCT International Patent Application No PCT/JP2013/065601 filed Jun. 5, 2013, claiming priority to Japanese Patent Application No. 2013-043726 filed Mar. 6, 2013, the entire contents of which are incorporated herein by reference.

TECHNICAL FIELD

The present invention relates to a system for controlling a continuously variable transmission and an engagement device of a vehicle, and especially to a hydraulic control system for a vehicle configured to keep a torque transmitting capacity of the engagement device to be smaller than that of the continuously variable transmission.

BACKGROUND ART

An inertia force of a running vehicle is governed by a total weight of the vehicle including weights of passengers and luggage, and the vehicle starts coasting after returning an accelerator pedal to disable a prime mover such as an engine to generate driving force. If deceleration of the vehicle is not especially demanded during coasting of the vehicle, a power transmission between the prime mover and drive wheels can be cutoff by bringing an engagement device disposed therebetween into disengagement. The prime mover may also be disconnected from the drive wheels by bringing the engagement device into disengagement if power transmission therebetween is not required when the vehicle is stopped by depressing a brake pedal or locking a parking gear. In addition, if a torque of the prime mover such as the engine is not required to generate torque, fuel supply to the engine can be stopped irrespective of a driver's operation by S & S (i.e., Stop and Start) control to save fuel.

A transmission adapted to transmit power by a friction between a transmission member and an input rotary member or an output rotary member is known in the art, but the transmission member and the input and the output rotary members of the transmission may be damaged by a slippage of the transmission member. In order to reduce damage of the transmission, the conventional vehicles are configured to reduce such slippage of the transmission member by keeping a torque transmitting capacity of the engagement device to be smaller than that of the transmission. In this kind of vehicle, application of excessive torque to a contact face between the transmission member and the rotary member can be prevented by allowing the engagement device to slip when a large torque is applied to a powertrain. That is, in the vehicle thus structured, the engagement device serves as a fuse. The torque transmitting capacities of the engagement device and the transmission can be controlled by controlling hydraulic pressure in a hydraulic actuator thereof applied from an electric oil pump or a mechanical oil pump driven by a torque of the engine.

After the hydraulic pressures in the actuators of the engagement device and the transmission are lowered by the S & S control, if the engine is restarted by the S & S control and the oil is delivered simultaneously to the engagement device and the transmission, the torque transmitting capacity of the engagement device would exceed the torque transmitting capacity of the transmission in relation to a structural difference therebetween. In order to avoid such disadvantage, the control device taught by Japanese Patent Laid-Open No. 2001-082594 is configured to start engagement of the engagement device after a line pressure as an initial pressure of the actuator is raised to a level at which a slippage between a belt and a pulley of a continuously variable transmission will not be caused. That is, the torque transmitting capacity of the engagement device is increased after increasing the torque transmitting capacity of the transmission sufficiently. According to the teachings of Japanese Patent Laid-Open No. 2001-082594, torques applied to the engagement device and the transmission are reduced by keeping the engine to an idling speed until the engagement of the engagement device is completed.

However, if a shift position is shifted from neutral position to drive position immediately after restarting the engine so that the pressurized oil is delivered to the transmission and the engagement device after the hydraulic pressures in the belt-driven continuously variable transmission and the engagement device have been lowered by stopping the engine under the S & S control, the torque transmitting capacity of the engagement device would exceed the torque transmitting capacity of the transmission. In order to avoid such disadvantage, the control device taught by Japanese Patent Laid-Open No. 2011-133012 is configured to control hydraulic pressure applied to the engagement device based on a torque transmitting capacity of the belt-driven continuously variable transmission in such a manner that the torque transmitting capacity of the engagement device is kept to be smaller than that of the transmission, if a shifting operation is carried out immediately after restarting the engine.

In turn, Japanese Patent Laid-Open No. 2008-014362 describes the controller of continuously variable transmission configured to increase a belt clamping pressure in accordance with a road gradient when starting the vehicle on an upward slope.

However, if engagement of the engagement device is started after restarting the engine so that the torque transmitting capacity of the belt-driven continuously variable transmission has been increased as taught by Japanese Patent Laid-Open No. 2001-082594, power cannot be transmitted to the drive wheels until the engagement device is enabled to transmit torque and hence acceleration response is degraded. In addition, if the hydraulic pressure applied to the engagement device is determined based on the torque transmitting capacity of the transmission when delivering oil to the transmission in response to a shift operation after restarting the engine as taught by Japanese Patent Laid-Open No. 2011-133012, the control of the engagement device may be complicated.

SUMMARY OF INVENTION

The present invention has been conceived noting the foregoing technical problems, and it is therefore an object of the present invention is to provide a hydraulic control system for a vehicle configured to avoid degradation of acceleration response by a simple control to keep torque transmitting capacity of an engagement device to be smaller than that of a continuously variable transmission.

The hydraulic control system according to the present invention is applied to a vehicle comprising: a continuously variable transmission in which a torque transmitting capacity thereof is changed hydraulically; and an engagement device which is connected to the continuously variable transmission in series, and in which a torque transmitting capacity thereof is changed hydraulically. In order to achieve the above-mentioned objective, the hydraulic control system is provided with a selecting means that selects a command pattern for setting an engagement pressure of the engagement device out of a plurality of patterns when an initial pressure is lower than a steady pressure for a normal running of the vehicle. Specifically, the selecting means is configured to select the command pattern in such a manner that the torque transmitting capacity of the engagement device does not exceed the torque transmitting capacity of the continuously variable transmission, based on at least any of conditions of the initial pressure that is lowered to be lower than the steady pressure, and a rotational speed of the continuously variable transmission.

The selecting means may includes a means that selects the command pattern based on a difference between rotational speeds of an input rotary member and an output rotary member of the engagement device.

The selecting means may also include a means that selects the command pattern based on a braking demand and a road gradient.

The vehicle further comprises a prime mover that generates a driving force, and a fluid coupling that is connected to the prime mover to deliver the driving force to the engagement device. The hydraulic control system further comprises a determining means that is configured to determine a commencement of an engagement of the engagement device based on a fact that an output speed of the fluid coupling is lowered under a condition that the initial pressure is raised to a level of the steady pressure.

The hydraulic control system further comprises a sweeping up means that is configured to increase the engagement pressure of the engagement device continuously in case the determining means determines a fact that the engagement of the engagement device has been commenced.

The engagement device may include a clutch and a brake of a torque reversing device that is adapted to reverse rotational directions of an input shaft and an output shaft.

The vehicle further comprises a mechanical oil pump that is driven by a power for propelling the vehicle to discharge oil.

The vehicle further comprises an electric oil pump that is driven by a motor to discharge oil and in which a capacity thereof is smaller than that of the mechanical oil pump.

The vehicle further comprises a regulator valve that regulates hydraulic pressure in a passage for the oil discharged from the mechanical oil pump, and the initial pressure in the passage is regulated by the regulator valve.

The oil discharged from the passage through the regulator valve when the hydraulic pressure in the passage is high is delivered to a low pressure site where a level of a required pressure is lower than a level of the pressure required by the engagement device or the continuously variable transmission.

Thus, the hydraulic control system according to the present invention is applied to a vehicle comprising: a continuously variable transmission in which a torque transmitting capacity thereof is changed hydraulically; and an engagement device which is connected to the continuously variable transmission in series, and in which a torque transmitting capacity thereof is changed hydraulically. When the initial pressure is lower than the steady pressure for normal running of the vehicle, the selecting means selects the command pattern for setting an engagement pressure of the engagement device in such a manner that the torque transmitting capacity of the engagement device does not exceeds the torque transmitting capacity of the continuously variable transmission. According to the present invention, therefore, the torque transmitting capacity of the engagement device can be kept to be lower than that of the continuously variable transmission even if the initial pressure is lower than the steady pressure so that the engagement device is allowed to serves as a fuse. Since the engagement pressure of the engagement device is prevented from being increased to an extent that the torque transmitting capacity of the engagement device exceeds the torque transmitting capacity of the continuously variable transmission, the engagement device can be promptly brought into engagement to transmit torque so that degradation of the acceleration response can be avoided. In addition, the pattern of increasing the engagement pressure of the engagement device is selected in accordance with the condition of the initial pressure and the rotational speed of the continuously variable transmission. For this reason, the control for setting the engagement pressure of the engagement device can be simplified.

Further, since the engagement pressure of the engagement device is determined based on a difference between rotational speeds of the input rotary member and the output rotary member of the engagement device, engagement shock of the engagement device can be reduced.

Furthermore, an abrupt start of the vehicle when bringing the engagement device into engagement can be prevented by selecting the command pattern of the engagement pressure of the engagement device based on a braking demand and a road gradient.

BRIEF DESCRIPTION OF THE DRAWINGS

FIG. 4 is a table showing command patterns of an engagement pressure of the clutch selected at step S1 shown in FIG. 1.

DESCRIPTION OF THE PREFERRED EMBODIMENT(S)

The present invention is applied to a vehicle having an engagement device a torque transmitting capacity thereof is changed hydraulically, and a continuously variable transmission. An example of a powertrain of the vehicle having the engagement device and a belt-driven continuously variable transmission (to be abbreviated as "CVT hereinafter) will be explained with reference to FIG. 2. In the powertrain shown in FIG. 2, an engine 1 adapted to generate power by burning fuel serves as a prime mover. For example, a gasoline engine, a diesel engine, an LPG engine and so on can be used as the engine 1. In order to crank the engine 1, a starter motor 2 is connected to the engine 1.

Figure 2:
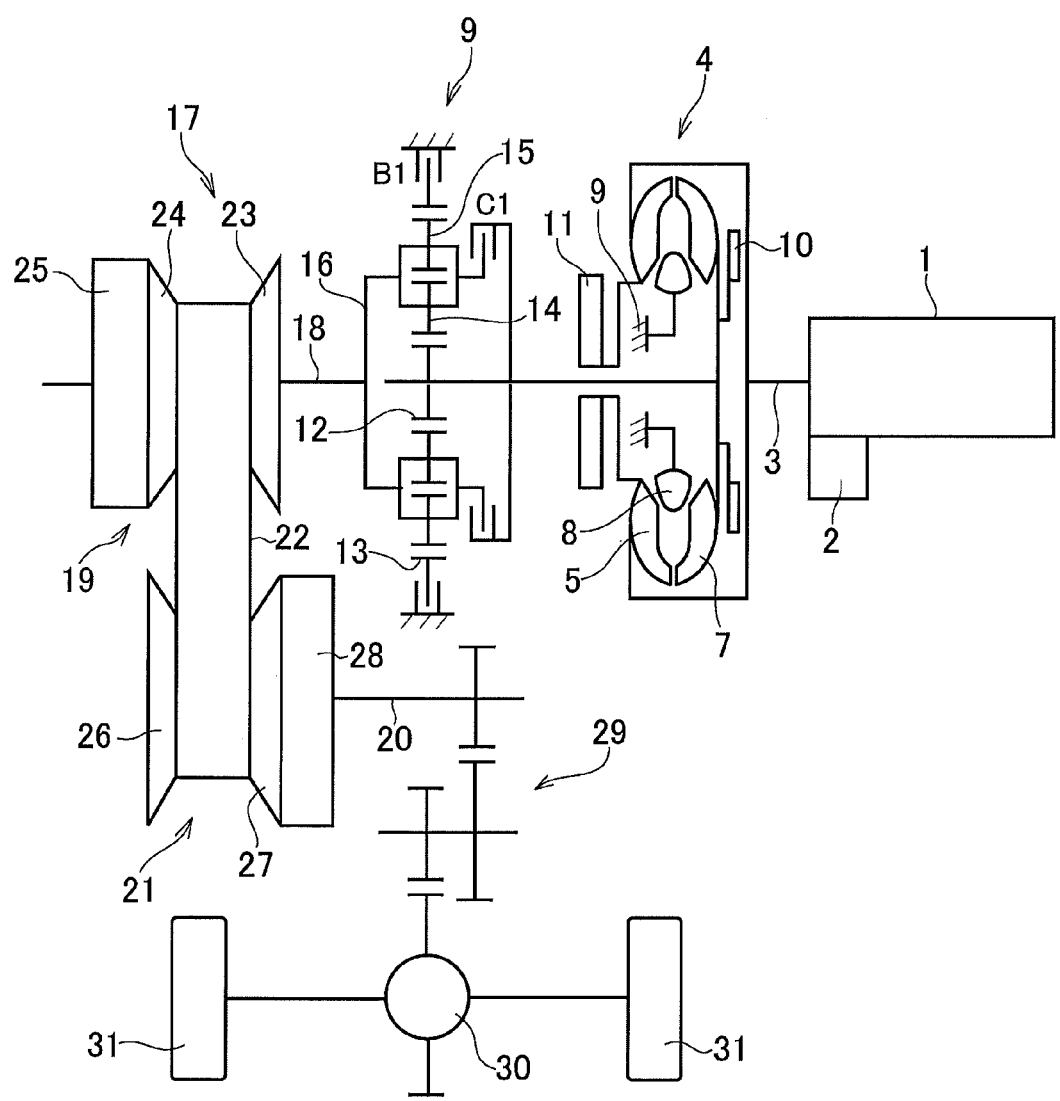
FIG. 2 is a schematic illustration showing one example of a powertrain of the vehicle to which the present invention is applied.

An output shaft 3 of the engine 1 is connected to a torque converter 4 adapted to transmit power hydraulically. The torque converter 4 is comprised of a pump impeller 5 rotated integrally with the output shaft 3 of the engine 1, and a turbine runner 7 connected to a below-mentioned torque reversing device 6. The turbine runner 7 is rotated by a spiral flow of oil created by a rotation of the pump impeller 5. That is, the torque converter 4 shown in FIG. 2 is a fluid coupling for transmitting power through fluid. In order to multiply input torque, a stator 8 is interposed between the pump impeller 5 and the turbine runner 7 to alter flowing direction of the oil. Specifically, the stator 8 is connected to a casing 9 through a not shown one-way clutch in such a manner that a direction of the oil flow returning from the turbine runner 7 to the pump impeller 5 is altered to a rotational direction of the pump impeller 5 rotated by the engine 1.

In order to transmit output torque of the engine 1 directly to the torque reversing device 6, a lockup clutch 10 is arranged in the torque converter 4 while being allowed to reciprocate in an axial direction in accordance with a pressure difference between both sides. Specifically, the lockup clutch 10 is allowed to move toward the engine 1 by reducing hydraulic pressure in the engine 1 side (i.e., the right side in FIG. 2) to transmit output torque of the engine 1 to the torque reversing device 6. In order to pump up oil in a not shown oil pan, the pump impeller 5 is connected to an oil pump 11 that is driven by the output torque of the engine 1.

The torque reversing device 6 is adapted to reverse a rotational direction of the turbine runner 7 serving as an output member of the torque converter 4 or the lockup clutch 10, and a rotational direction of an input shaft 18 of a below-mentioned CVT 17. As shown in FIG. 2, the torque reversing device 6 is a double-pinion planetary gear unit comprised of a sun gear 12 as an external gear, a ring gear 13 as an internal gear, an inner pinion gear 14, an outer pinion gear 15 and a carrier 16. The sun gear 12 is connected to the turbine runner 7 and the inner pinion gear 14 is meshed therewith. The inner pinion gear 14 is also meshed with the outer pinion gear 15, and the outer pinion gear 15 is also meshed with the ring gear 13. The carrier 16 is connected to the CVT 17 while supporting the pinion gears 14 and 15 in such a manner that the pinion gears 14 and 15 are allowed to rotate and revolve around the sun gear 12. Thus, the sun gear 12 serves as an input element, the carrier 16 serves as an output element, and the ring gear 13 serves as a reaction element.

The carrier 16 is integrated with the sun gear 12 by bringing a clutch C1 into engagement so that the torque reversing device 6 is rotated integrally and the turbine runner 7 is rotated in a same direction as an input shaft 18 of the CVT 17. The ring gear 13 is halted by bringing a brake B1 into engagement so that the sun gear 12 and the carrier 16 are rotated in opposite directions. That is, the rotational directions of the turbine runner 7 and the input shaft 18 of the CVT 17 are reversed by bringing a brake B1 into engagement. The clutch C1 and the brake B1 respectively serve as the claimed engagement device, and torque transmitting capacities thereof are varied in accordance with hydraulic pressure applied thereto.

The CVT 17 shown in FIG. 2 is adapted to transmit power from the torque reversing device 6 while changing a speed and torque. The CVT 17 is comprised of the input shat 18 connected to the torque reversing device 6, a primary pulley 19 rotated integrally with the input shaft 18, an output shaft 18*b* arranged parallel to the input shaft 18, a secondary pulley 21 rotated integrally with the output shaft 20, and an endless belt 22 running on the primary pulley 19 and the secondary pulley 21. The primary pulley 19 is comprised of a conical fixed sheave 23 integrated with the input shaft 18, a conical movable sheave 24 fitted onto the input shaft 18 while being allowed to reciprocate thereon and rotate integrally therewith, and a hydraulic actuator 25 arranged on a back face of the movable sheave 24 to push the movable sheave 24 hydraulically. Likewise, the secondary pulley 21 is comprised of a conical fixed sheave 26 integrated with the output shaft 20, a conical movable sheave 24 fitted onto the output shaft 20 while being allowed to reciprocate thereon and rotate integrally therewith, and a hydraulic actuator 28 arranged on a back face of the movable sheave 27 to push the movable sheave 27 hydraulically. Torque of the output shaft 20 of the CVT 17 is delivered to drive wheels 31 through a gear train 29 and a differential gear unit 30.

Running radii of the belt 22 are changed in accordance with a pressure difference between the actuators 25 and 28, and a torque transmitting capacity of the CVT 17 is changed by altering the hydraulic pressure in at least one of the actuators 25 and 28 to alter a thrust load applied to the belt 22. A current speed ratio of the CVT 17 is calculated based on rotational speeds of the input shaft 18 and the output shaft 20, and the hydraulic pressure applied to the primary pulley 19 is adjusted in such a manner that the current speed ratio is adjusted to a target speed ratio. Specifically, the torque transmitting capacity of the CVT 17 is controlled by controlling the hydraulic pressure applied to the secondary pulley 21 in such a manner not to cause a slippage between the belt 22 and each pulley 19 and 21 by torque inputted to the CVT 17 depending on a road condition and vehicle speed.

In the powertrain thus structured, the clutch C1 is brought into engagement when propelling the vehicle in the forward direction by delivering power of the engine 1 to the drive wheels 31, and the brake B1 is brought into engagement when propelling the vehicle in the backward direction by delivering power of the engine 1 to the drive wheels 31. As described, torque transmitting capacities of the clutch C1 and the brake B1 are varied depending on the hydraulic pressure applied thereto. That is, the clutch C1 or the brake B1 is caused to slip if a torque larger than the current torque transmitting capacity is applied thereto. Those clutch C1 and the brake B1 are maintained in disengagement if it is not necessary to transmit power between the engine 1 and the drive wheels 31. Specifically, the clutch C1 and the brake B1 are brought into disengagement under conditions that neither braking force nor driving force is required during coasting of the vehicle, and that the vehicle is stopped by a braking device or a parking gear. In addition, the clutch C1 and the brake B1 are brought into disengagement if the shift lever is shifted to the "N" position. In the powertrain, the engine 1 may be stopped if auxiliaries such as a battery and an air-conditioner or the drive wheels 31 are not required to be driven by the engine 1.

When power transmission between the engine 1 and the drive wheels 31 is interrupted by bringing the clutch C1 and the brake B1 into disengagement, slippage between the belt 22 and the pulley 19 or 22 will not be caused by a torque applied to the CVT 17 from the drive wheels 31 even if the torque transmitting capacity of the CVT 17 is small. That is, the torque transmitting capacity of the CVT 17 can be reduced in this situation.

Next, a preferred example of the hydraulic circuit for delivering pressurized oil to the clutch C1, the brake B1 and the actuators 25 and 28 will be explained with reference to FIG. 3. In the hydraulic circuit shown in FIG. 3, the oil pump 11 serves as a hydraulic source to pump up the oil in an oil pan 32. Specifically, the oil pump 11 is a mechanical pump and connected to the pump impeller 5 so that the oil pump 11 is rotated by rotation of the engine 1 to pump up the oil from the oil pan 32. In order to support the mechanical oil pump 11, the electric oil pump 33 activated by the electric power supplied from the battery is arranged parallel to the mechanical oil pump 11. However, a capacity of the electric oil pump 33 to pump up the oil is smaller than that of the mechanical oil pump 11.

The oil pumped up by the oil pumps 11 and 33 is discharged to an oil passage 34 on which a primary regulator valve 35 is disposed to regulate hydraulic pressure in the oil passage 34. Specifically, a signal pressure according to an opening degree of an accelerator is applied to the primary regulator valve 35, and the hydraulic pressure in the oil passage 34 is regulated by the primary regulator valve 35 in accordance with the signal pressure applied to the primary regulator valve 35. Specifically, the primary regulator valve 35 is opened if the hydraulic pressure in the oil passage 34 exceeds the signal pressure applied to the primary regulator valve 35. By contrast, the primary regulator valve 35 is closed if the hydraulic pressure in the oil passage 34 falls below the signal pressure applied to the primary regulator valve 35. The oil discharged from the primary regulator valve 35 is delivered to sites where a required pressure is relatively low such as a lubrication site 36 and a torque converter 4.

Hydraulic pressures applied to the actuators 25 and 28, the clutch C1 and the brake B1 are governed by the hydraulic pressure in the oil passage 34 as an initial pressure (i.e., a line pressure). On the oil passage 34, a first control valve 37 is disposed to control an amount of the pressurized oil delivered to the actuator 25 of the primary pulley 19, a second control valve 38 is disposed to control an amount of the pressurized oil delivered to the actuator 28 of the secondary pulley 21, and a third control valve 39 is disposed to control an amount of the pressurized oil delivered to the clutch C1 and the brake B1. For example, a solenoid valve, a control valve opened by the signal pressure, a spool valve etc. may be used as the control valves 37, 38 and 39. Optionally, an intensifier control valve and a depressurizing control valve may be arranged separately for each actuator 25 and 28, the clutch C1 and the brake B1.

Figure 3:
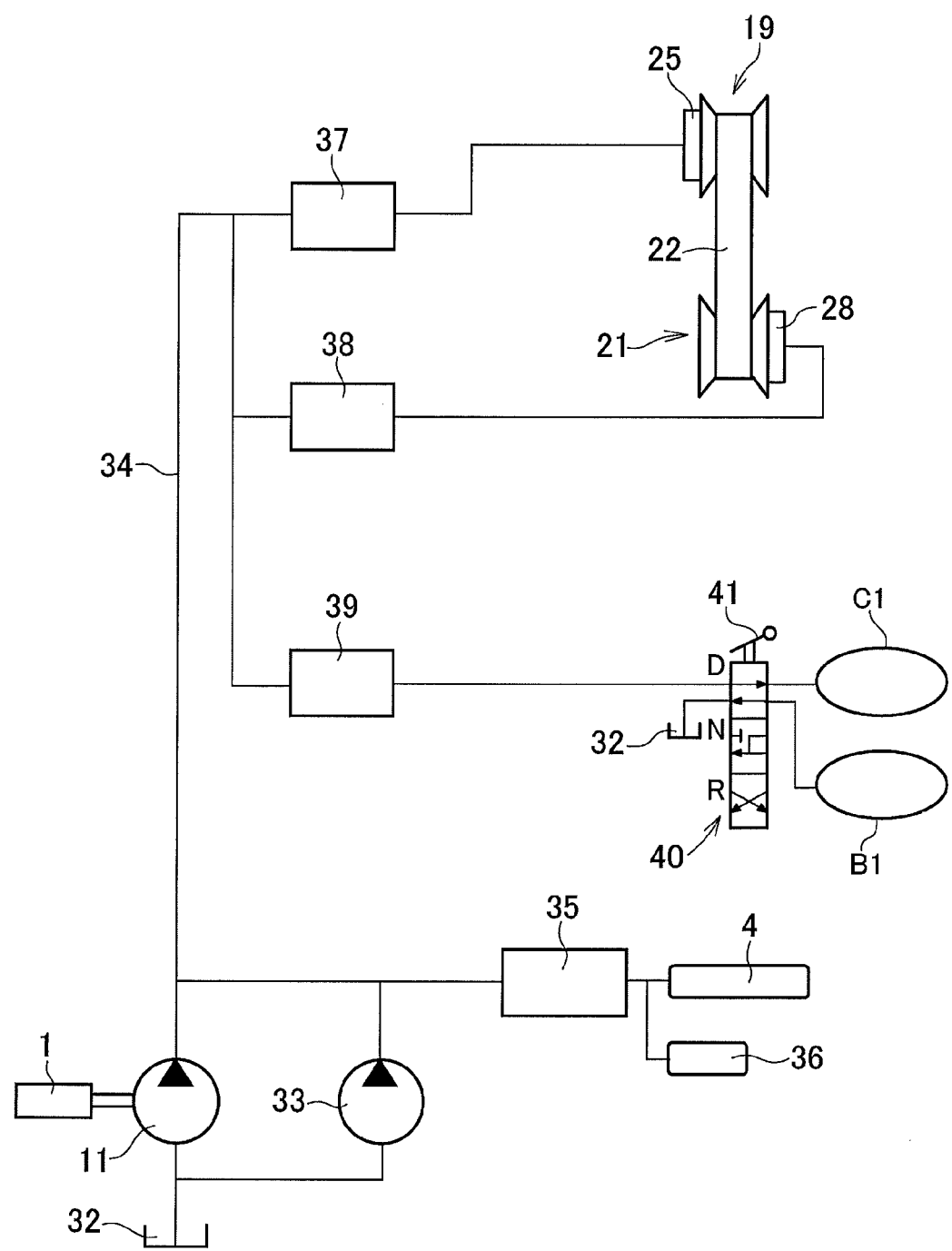
FIG. 3 is a schematic illustration showing one example of a hydraulic circuit in the powertrain for delivering oil to the hydraulic actuator, a clutch and a brake.

In addition, in the example shown in FIG. 3, a changeover valve 40 is disposed between the third control valve 39 and the clutch C1 or the brake B1. When the shift lever 41 is in "D" position, the changeover valve 40 provides a connection between the clutch C1 and the third control valve 39 while allowing the brake B1 to drain oil therefrom. When the shift lever 41 is in "N" position, the changeover valve 40 allows the clutch C1 and the brake B1 to drain oil therefrom. When the shift lever 41 is in "R" position, the changeover valve 40 provides a connection between the brake B1 and the third control valve 39 while allowing the clutch C1 to drain oil therefrom.

The powertrain and the hydraulic circuit are connected to an electronic control unit (to be abbreviated as "ECU" hereinafter) comprising a ROM for storing a predetermined calculation formulas and maps, a RAM for temporarily storing detection signals from sensors and calculation values, and a CPU for carrying out a calculation. For example, detection signals about an engine speed Ne, a turbine speed Nt, a rotational speed of the input shaft 18 of the CVT 17, a rotational speed of the output shaft 20 of the CVT 17, hydraulic pressures in the actuators 25 and 28, hydraulic pressures applied to the clutch C1 and the brake B1, a position of the shift lever 41, actuations of the accelerator and the brake and so on are transmitted to the ECU. The ECU is configured to send a signal for controlling hydraulic pressure applied to the control valve, a signal for controlling air-fuel mixture supplied to the engine 1 and so on in response to incident signals.

In the vehicle thus structured, the line pressure is kept to a steady pressure by driving the mechanical oil pump 11 by the engine 11 during steady running of the vehicle. However, the clutch C1 and the brake B1 are brought into disengagement when driving force is not especially demanded, when an engine braking force is not especially required, and when the shift lever 41 is in "N" position. The engine 1 is also stopped when the auxiliaries are not required to be operated. When the engine 1 is stopped, the mechanical oil pump 11 is also stopped and hence the line pressure drops. In this situation, if the shift lever 41 is shifted from "N" position to "D" position, the torque transmitting capacity of the clutch C1 will be raised promptly to be greater than that of the CVT 17. The hydraulic control system according to the present invention is configured to keep the torque transmitting capacity of the clutch C1 or the brake B1 to be smaller than that of the CVT 17 as long as the line pressure as the initial pressure is lower than the steady pressure, and to avoid degradation of acceleration response. Specifically, the hydraulic control system is configured to select a command pattern of engagement pressures of the clutch C1 and the brake B1 from a plurality of patterns, and to adjust the engagement pressure of the clutch C1 or the brake B1 in accordance with the selected command pattern.

Figure 1:
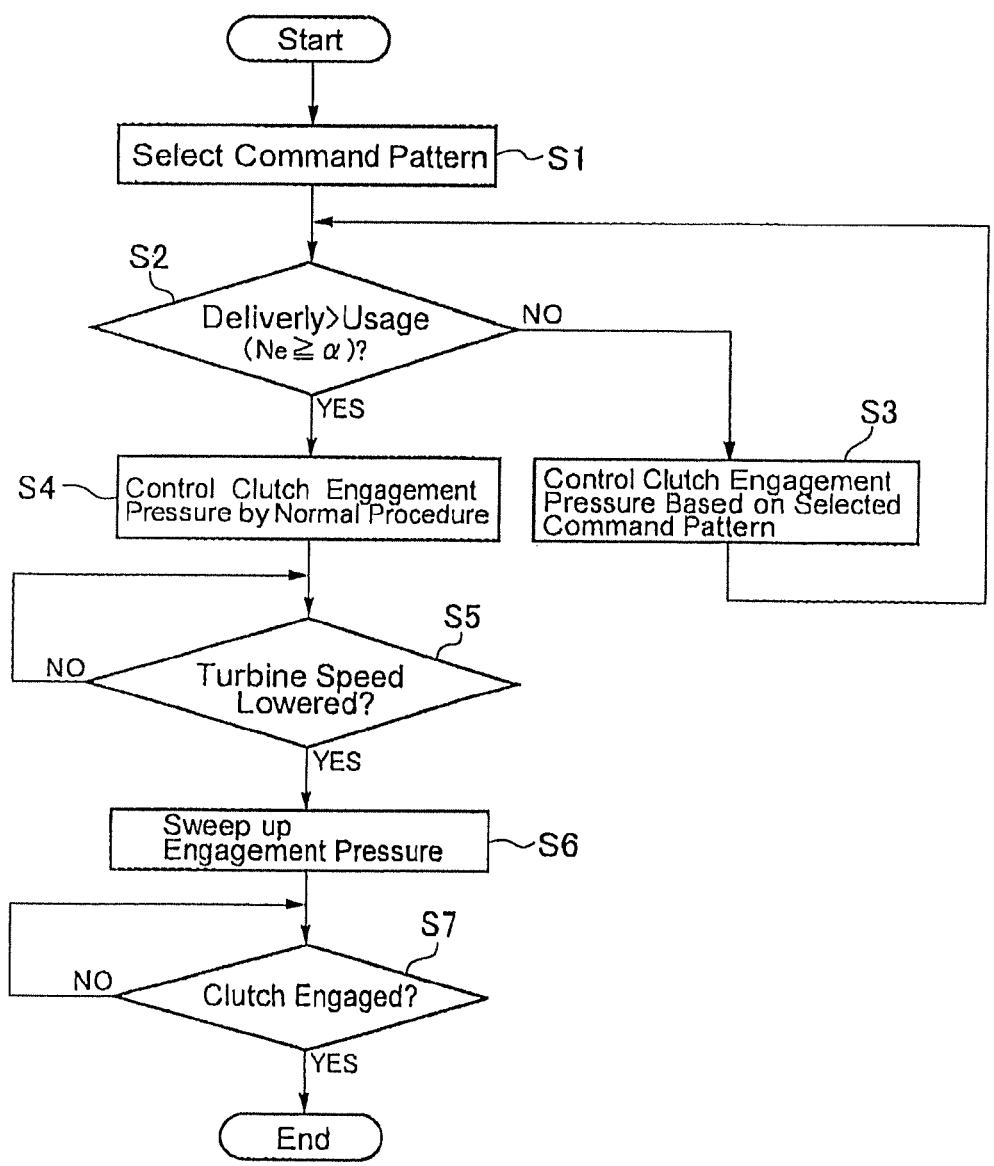
FIG. 1 is a flowchart showing a control example of the hydraulic control system according to the present invention.

Turning to FIG. 1, there is shown a control example to be carried out by the hydraulic control system. The routine shown in FIG. 1 is executed when the operation range is shifted from "N" range where the vehicle is allowed to be moved freely to "D" range or "R" range where the vehicle is powered by the prime mover. Hereinafter, an example in which the operation range is shifted from "N" range to "D" range will be explained. Here, it is to be noted that the drive range may be shifted not only by a manual operation of the shift lever 41 by the driver but also automatically depending on driving conditions of the vehicle. For example, the drive range would be shifted automatically irrespective of a position of the shift lever 41 when the clutch C1 is brought into engagement by depressing the accelerator pedal under condition that the vehicle is coasting while keeping the clutch C1 and the brake B1 into disengagement, or that the vehicle is stopping under neutral range. The control shown in FIG. 1 may be carried out even in the above-explained situations.

When the operation range is shifted from "N" range to "D" range, a command pattern of setting an engagement pressure of the clutch C1 is selected (at step S1). At step S1, the command patterns of the clutch C1 is selected with reference to a table shown in FIG. 4. As can be seen from FIG. 4, first of all, it is determined whether or not the line pressure is high enough to establish hydraulic pressure. For example, if the engine 1 is stopped and hence the mechanical oil pump 11 is also stopped, or if the electric oil pump 33 is in trouble, the ECU determines a fact that the hydraulic pressure cannot be established and the hydraulic pressure is therefore insufficient. By contrast, given that the electric oil pump 33 functions properly, the ECU determines that the hydraulic pressure is ready to be established even if the mechanical oil pump 11 is not driven. To this end, for example, current condition of the line pressure can be determined based on a detected pressure in the oil passage 34, or a failure detection signal of the electric oil pump 33. If the ECU determines that the hydraulic pressure is insufficient, pattern A in which the engagement pressure of the clutch C1 is relatively high is selected. Here, the determination of the line pressure shown in FIG. 4 is executed under condition that the current line pressure is lower than the line pressure during steady running (i.e., the steady pressure). The condition in which the hydraulic pressure is insufficient, and the condition in which the hydraulic pressure can be established correspond to the claimed "condition of the initial pressure".

In case the electric oil pump 33 functions properly to establish the hydraulic pressure, the command pattern is selected based on a condition of the engine 1. Specifically, in case the engine 1 is not required to deliver the power to the drive wheels 31 and the auxiliaries and hence the ECU executes a control to stop the engine 1, pattern B is selected. In addition, the pattern B is also selected during restating the engine 1. That is, the pattern B is selected during the situation in which the engine 1 is not driven stably. To this end, the condition of the engine 1 can be determined based on a commend signal from an electronic control unit for controlling the engine 1, or based on whether or not the engine speed Ne is lower than the idling speed.

In turn, when the engine is stopped by the Stop & Start control, the command pattern is selected based on a rotational speed of the secondary pulley 21. Specifically, the pattern B is also selected if the rotational speed of the secondary pulley 21 is higher than a reference speed for determining whether or not the vehicle is coasting while bringing the clutch C1 and the brake B1 into disengagement. If the clutch C1 or the brake B1 is brought into engagement abruptly under the condition that the rotational speed of the secondary pulley 21 is higher than the reference speed during propulsion of the vehicle, slippage of the belt 22 and shocks would be caused by an inertia force of the vehicle. In order to avoid such disadvantages, the pattern B in which the engagement pressure of the clutch C1 is lowest is selected in case the rotational speed of the secondary pulley 21 is higher than the reference speed.

When the vehicle is stopped, the turbine runner 7 is stopped after the engine is stopped. That is, the turbine runner 7 may still be rotated by an inertia force immediately after stopping the engine 1. In this situation, an engagement shock of the clutch C1 would be caused even if the rotational speed of the secondary pulley 21 is lower than the reference speed and the engine 1 is stopped in the stopped vehicle. In this case, the command pattern is selected based on whether or not a difference between a turbine speed Nt as an input speed of the clutch C1 and a pulley speed Nin of the primary pulley 19 as an output speed of the clutch C1 is larger than a predetermined value. Specifically, the predetermined value is a criterion that the driver feels an engagement shock under the above-mentioned condition, and to this end, the predetermined value is determined based on a result of experimentation or simulation. If the difference between the turbine speed Nt and the pulley speed Nin is larger than the predetermined value, the pattern B is selected.

By contrast, if the difference between the turbine speed Nt and the pulley speed Nin is smaller than the predetermined value, the command pattern is selected based on an existence of braking demand or an execution of a braking operation and a road gradient, so as to avoid a sudden starting of the vehicle resulting from abrupt transmission of power to the drive wheels 31 by bringing the clutch C1 into engagement. Specifically, in case the brake is not operated and the vehicle is stopping on a flat road, pattern C in which the engagement pressure of the clutch C1 is relatively low is selected. However, in case the brake is operated and the vehicle is stopping on an upward slope, pattern D in which the engagement pressure of the clutch C1 is highest is selected. To this end, an execution of braking operation may be detected based on a signal from a detection switch of the brake pedal. In the table shown in FIG. 4, the situation in which the brake pedal is not depressed is indicated as "OFF", and the situation in which the brake pedal is depressed is indicated as "ON".

Thus, the engagement pressure of the clutch C1 is increased from the pattern D, A, C, and B in order, and a change rate of the engagement pressure is also increased in the above-mentioned order. If the pattern D is selected, an engagement shock of the clutch C1 will not be caused, and the vehicle will not be started suddenly by bringing the clutch C1 into engagement. For this reason, the line pressure can be established without keeping a command pressure of the clutch C1 to a specific level if the pattern D is selected.

After thus selecting the command pattern of the engagement pressure of the clutch C1 at step S1, it is determined whether or not a delivery amount of the oil to the hydraulic circuit is larger than a usage of the oil in the hydraulic circuit (at step S2). Specifically, a discharging amount of the mechanical oil pump 11 is increased with a rise in the engine speed Ne, and hence the determination at step S2 can be made by comparing the engine speed Ne with a reference speed $\alpha$.

If the engine has not yet been started even after execution of the shifting operation of the shift lever 41 by the driver, or if the engine speed Ne has not yet been raised to be higher than the reference speed $\alpha$, answer of step S2 will be NO. In this case, the hydraulic pressure may not be raised to a sufficient level to ensure a torque transmitting capacity of the CVT 17. In this situation, if a large amount of the oil is delivered to the clutch C1 to increase the engagement pressure of the clutch C1 excessively, the torque transmitting capacity of the clutch C1 would exceed the torque transmitting capacity of the CVT 17. In order to prevent such situation, the engagement pressure of the clutch C1 is controlled based on the command pattern selected at step S1 until the engine speed Ne is raised to exceed the reference speed $\alpha$ (at step S3). Here, at step S3, if the discharging amount of the oil pump 11 based on the selected command pattern is insufficient to bring the clutch C1 into engagement, the electric oil pump 33 is driven to discharge the oil.

When the discharging amount of the oil pump 11 has been raised to be larger than the reference speed $\alpha$ so that the answer of step S2 is YES, the engagement pressure of the clutch C1 is controlled by normal procedure (at step S4). At step S4, specifically, the engagement pressure of the clutch C1 is raised to be larger than that set at step S3. Then, it is determined whether or not the turbine speed Nt has been lowered (at step S5). At step S5, specifically, it is determined whether or not power transmission from the turbine runner 7 to the primary pulley 19 is started by bringing the clutch C1 into engagement by a constant pressure. Such determination at step S5 may also be made based on whether or not a change rate of the turbine speed Nt is negative value. If the turbine speed Nt has not yet been lowered so that the answer of step S5 is NO, the engagement pressure of the clutch C1 is kept to a constant level and the determination at step S5 is repeated until the turbine speed Nt stats lowering.

By contrast, if the turbine speed Nt has already been lowered so that the answer of step S5 is YES, the engagement pressure of the clutch C1 is swept up continuously (at step S6), and then it is determined whether or not the clutch C1 has been brought into engagement (at step S7). At step S7, the engagement of the clutch C1 can be determined based on a fact that the turbine speed Nt is synchronized with the rotational speed Nin of the primary pulley 19. If the engagement of the clutch C1 has not yet been completed so that the answer of step S7 is NO, the sweep up of the engagement pressure of the clutch C1 is continued and the determination at step S7 is repeated until the clutch C1 is brought into engagement completely. By contrast, if the engagement of the clutch C1 has already been completed so that the answer of step S7 is YES, the routine shown in FIG. 1 is ended. After the completion of engagement of the clutch C1, the engagement pressure is kept to a predetermined level.

Figure 5:
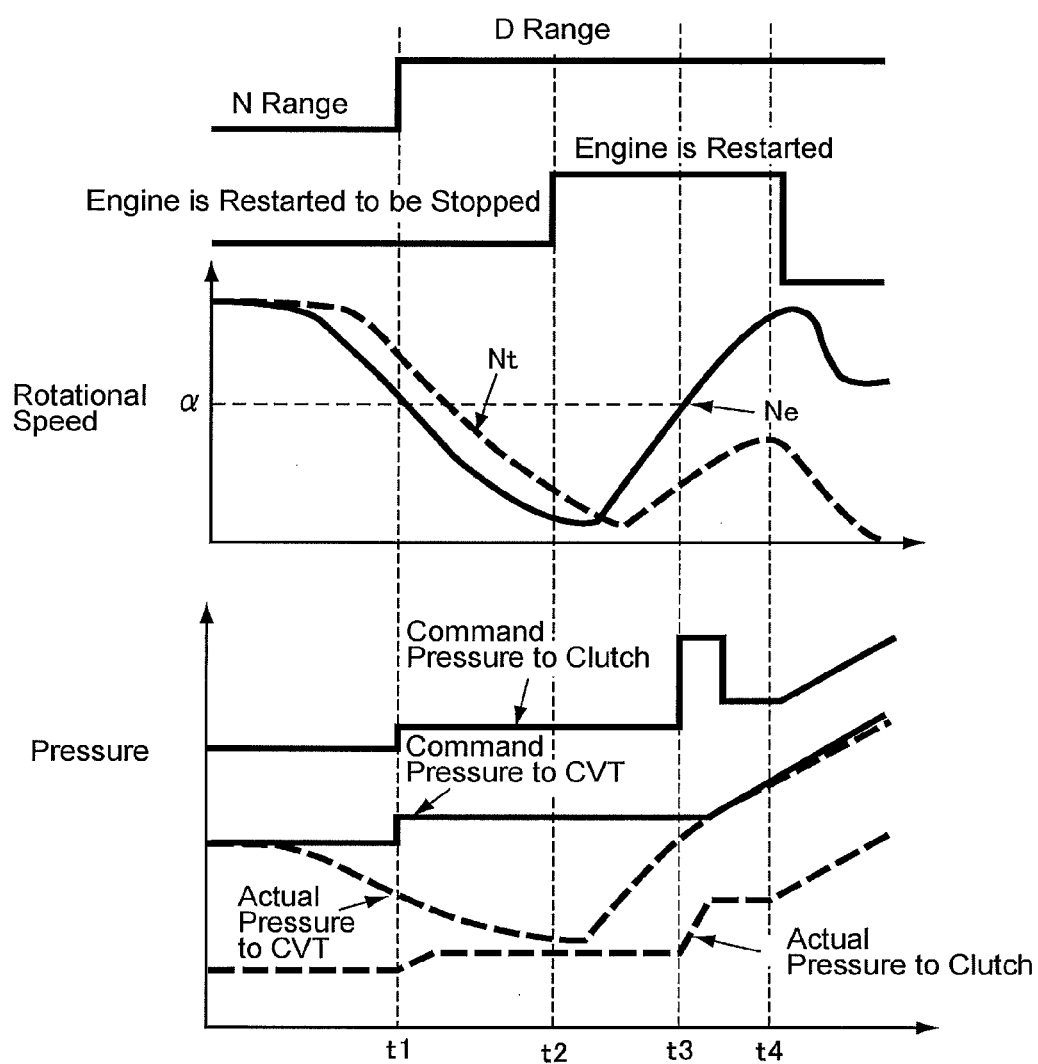
FIG. 5 is a time chart indicating changes in speeds of the engine and the turbine runner, command pressures of the clutch and the CVT, and actual hydraulic pressures applied to the clutch and the CVT under condition that a shift position is shifted to D range during execution of the control for stopping the engine.

Here will be explained changes in the engine speed Ne, the turbine speed Nt, the command pressure to the clutch C1, the command pressure for controlling the belt clumping pressure of the CVT 17, an actual pressure applied to the CVT 17, and the actual pressure applied to the clutch C1 with reference to the time chart shown in FIG. 5. In the section showing changes in the rotational speeds, the solid line represents the engine speed Ne, and a broken line represents the turbine speed Nt. In the section showing changes in the command pressures, each solid line individually represents the command pressure to the clutch C1 and the command pressure to the CVT 17, and each broken line individually represents the actual pressure applied to those members. Here, the torque transmitting capacity of each member is changed in proportion to a change in the actual pressure applied thereto. Specifically, FIG. 5 shows a situation in which the shift lever 41 is shifted from the "N" position to the "D" position during execution of the control for stopping the engine 1 automatically. In this situation, therefore, the pattern B is selected to set the engagement pressure of the clutch C1 to be lower than that under other patterns. When the shift lever 41 is shifted from the "N" position to the "D" position at point t1, the control shown in FIG. 1 is started and the pattern B of the engagement pressure of the clutch C1 is selected. Then, the determination of whether or not a delivery amount of the oil to the hydraulic circuit is larger than a usage of the oil in the hydraulic circuit is made at step S2. At point t1, the engine speed Ne is lowered and hence the delivery amount of the oil is smaller than the usage amount so that the answer of step S2 is NO in this situation. Consequently, the clutch C1 is brought into engagement by the engagement pressure of the pattern B so that the torque transmitting capacity of the clutch C1 is established in accordance with the engagement pressure of the pattern B.

As a result of such reduction in the engine speed Ne during execution of the control for stopping the engine 1 automatically, a discharging amount of the oil from the oil pump 11 is reduced. In this situation, an actual pressure applied to the CVT 17 is lowered irrespective of the command pressure thereto. Consequently, the torque transmitting capacity of the CVT 17 is reduced. When the control for bringing the clutch C1 into engagement is executed at point t1, the torque applied to the CVT 17 is increased and hence the command pressure delivered to the CVT 17 is increased stepwise. In this situation, the turbine speed Nt is lowered after the reduction of the engine speed Ne.

Then, after a predetermined time has elapsed from point t1 and a determination of a fact that the driver selects "D" range has made, the control for stopping the engine 1 is terminated and the control for restarting the engine 1 is commenced at point t2. During the period from t1 to t2, specifically, a determination of whether or not the shift lever 41 is shifted to another shift position through the "D" position is made. As a result of starting the control for restarting the engine 1 at point t2, the actual pressure applied to the CVT 17 starts increasing so that the torque transmitting capacity thereof is increased. Consequently, the turbine speed Nt starts increasing slightly after an increment of the engine speed Ne. Such temporal delay is a required time to transmit the torque of the engine 1 to the turbine runner 7 through the oil.

When the engine speed Ne exceeds the reference speed α at point t3 so that the affirmative determination is made at step S2 shown in FIG. 1, the engagement pressure of the clutch C1 is controlled by normal procedure. In the example shown in FIG. 5, specifically, the command pressure to the clutch C1 is temporarily increased stepwise at point t3, and then maintained to a level higher than that before point t3. Consequently, the torque transmitting capacity of the clutch C1 is increased. As a result of the increment of the engine speed Ne, the actual pressure applied to the CVT 17 is gradually increased to the command pressure to the CVT 17 after point t3. Then, the command pressure to the CVT 17 is continuously increased gradually.

When the command pressure to the clutch C1 is increased to the level for the normal running so that the clutch C1 starts transmitting torque, the turbine speed Nt starts lowering at point t4. In this situation, an affirmative determination is made at step S5 so that the sweep up of the command pressure to the clutch C1 is executed. Consequently, the actual pressure applied to the clutch C1 is increased in proportion to the increment of the command pressure so that the torque transmitting capacity thereof is also increased proportionally. Although not especially shown in FIG. 5, when the turbine speed Nt is synchronized with the speed Nin of the primary pulley 19 so that the complete engagement of the clutch C1 is determined, the command pressure to the clutch C1 is kept to a predetermined level and the control shown in FIG. 1 is terminated.

Figure 6:
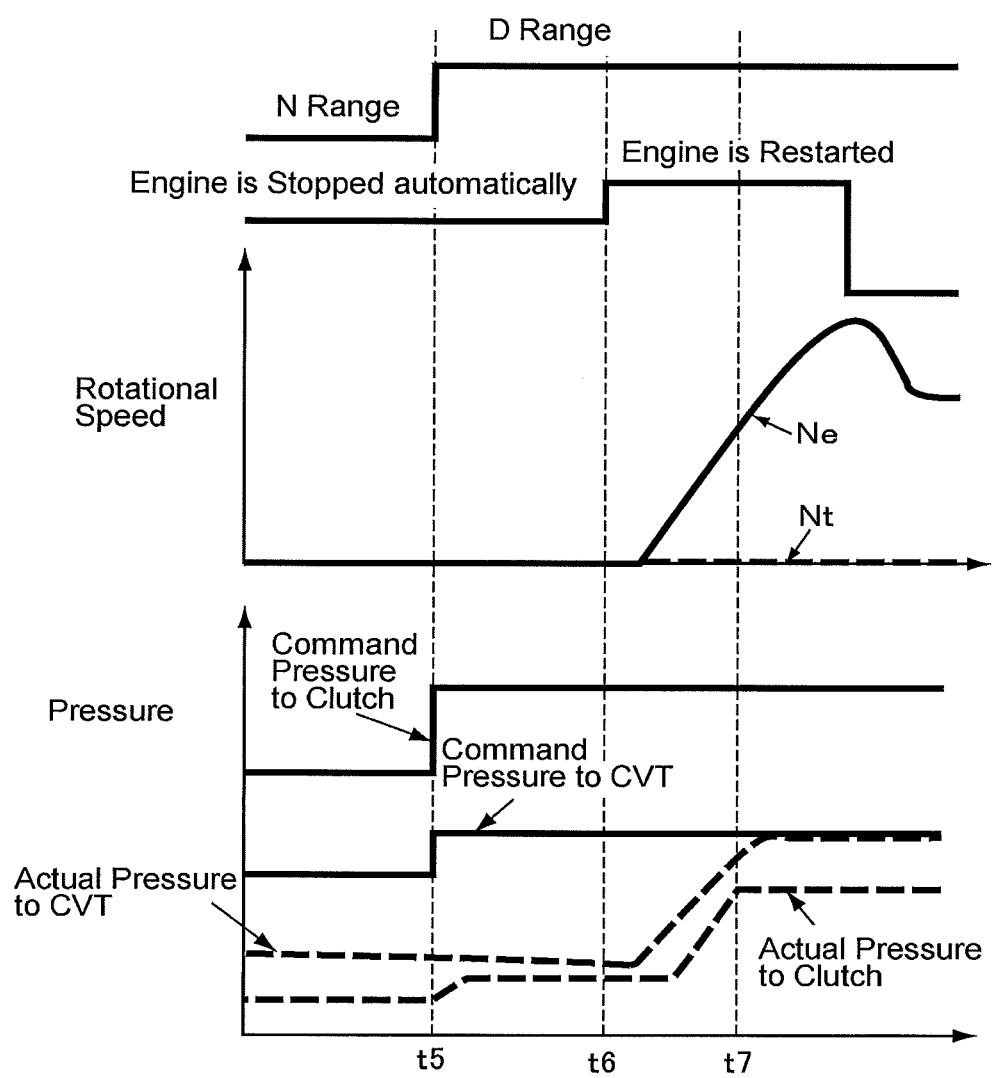
FIG. 6 is a time chart indicating changes in speeds of the engine and the turbine runner, command pressures of the clutch and the CVT, and actual hydraulic pressures applied to the clutch and the CVT under condition that a shift position is shifted to D range during stopping the engine.

Next, changes in the engine speed Ne, the turbine speed Nt, the command pressure to the clutch C1, the command pressure for controlling the belt clumping pressure of the CVT 17, the actual pressure applied to the CVT 17, and the actual pressure applied to the clutch C1 when shifting the shift lever 41 from the "N" position to the "D" position during stopping the engine 1 by depressing the brake pedal will be explained with reference to the time chart shown in FIG. 6. In the section showing changes in the rotational speeds, the solid line represents the engine speed Ne, and a broken line represents the turbine speed Nt. In the section showing changes in the command pressures, each solid line individually represents the command pressure to the clutch C1 and the command pressure to the CVT 17, and each broken line individually represents the actual pressure applied to those members. Here, the torque transmitting capacity of each member is changed in proportion to a change in the actual pressure applied thereto. In the example shown in FIG. 6, the engine 1 is stopped automatically at point t5 when the operation range is shifted. In this situation, the brake pedal is depressed and hence the pattern D of the engagement pressure is selected to engage the clutch C1 by applying the pressure established by the line pressure without keeping the engagement pressure to the relatively low waiting pressure. In FIG. 5, specifically, the command pressure to the clutch C1 is raised stepwise at point t5 and maintained afterward. However, since the engine 1 is stopped, the discharging amount of the oil from the oil pump 11 is small. In this situation, therefore, the actual pressure applied to the clutch C1 is low and hence the torque transmitting capacity thereof is small. Likewise, the command pressure to the CVT 17 is also raised stepwise to a level at which a slippage of the belt 22 will not be caused by the torque applied to the CVT 17 when the vehicle is started. However, the actual pressure applied to the CVT 17 is kept to a low level and hence the torque transmitting capacity thereof is still small in this situation.

Then, after a predetermined time has elapsed since the operation range was shifted, the control for restarting the engine 1 is started at point t6. Consequently, the engine speed Ne is raised and the actual pressures applied to the clutch C1 and the CVT 17 (or the torque transmitting capacities thereof) starts increasing. Then, the torque transmitting capacity of the clutch C1 is increased to a level corresponding to the command pressure thereto. In this situation, although the engine speed Ne is increased, the brake is actuated and hence the turbine speed Nt is not increased.

Thus, the torque transmitting capacity of the clutch C1 is prevented from being increased to be larger than that of the CVT 17 when the engagement of the clutch C1 is commenced. To this end, the engagement pressure of the clutch C1 is kept to a relatively low level until the discharging amount of the oil from the oil pump 11 is increased. Specifically, the engagement pressure of the clutch C1 stays to the prior low level even when the engagement pressure is increased after the discharging amount of the oil from the oil pump 11 has been increased so that the torque transmitting capacity of the belt 22 has been increased. For this reason, an increasing amount of the engagement pressure of the clutch C1 can be reduced so that a required time to raise the engagement pressure of the clutch C1 can be shortened. That is, a required time to start transmitting torque by the clutch C1 can be shortened so that degradation of the acceleration response can be avoided. In addition, pattern of increasing the engagement pressure of the clutch C1 can be selected in accordance with the conditions of the line pressure and the engine 1, and the rotational speeds of the rotary members. For this reason, the control for setting the engagement pressure of the clutch C1 can be simplified. Further, since the engagement pressure of the clutch C1 is thus determined based on the difference between the turbine speed Nt and the pulley speed Nin, engagement shock of the clutch C1 can be reduced.

Although the present invention is applied to the belt-driven continuously variable transmission in the foregoing examples, the control system of the present invention may be applied to any kinds of transmissions in which a torque transmitting capacity thereof is controlled hydraulically such as a toroidal continuously variable transmission. In addition, the factors for selecting the command pattern of the engagement pressure of the clutch may be reduced or increased according to need. The factors for selecting the command pattern of the engagement pressure of the clutch may also be further reduced or increased.

The invention claimed is:

1. A hydraulic control system for a vehicle comprising a continuously variable transmission in which a torque transmitting capacity thereof is changed hydraulically, and an engagement device which is connected to the continuously variable transmission in series and in which a torque transmitting capacity thereof is changed hydraulically, comprising:
an electronic control unit including a ROM for storing predetermined calculation formulas and maps, a RAM for temporarily storing detection signals from sensors and calculation values, and a CPU for carrying out a calculation,
the control unit configured to select a command pattern for setting an engagement pressure of the engagement device out of a plurality of patterns based on first and second line pressures of an oil passage of the system, where the first pressure is an initial pressure detected by at least one of the sensors, and the second pressure is a predetermined steady pressure corresponding to normal operation of the vehicle, and the electronic control unit is configured to select the command pattern for setting the engagement pressure of the engagement device out of the plurality of patterns when the initial pressure is lower than the steady pressure; and
wherein the control unit is further configured to select the command pattern in such a manner that the torque transmitting capacity of the engagement device does not exceed the torque transmitting capacity of the continuously variable transmission, when the initial pressure is lower than the steady pressure, and does not exceed a rotational speed of the continuously variable transmission.

2. The hydraulic control system for a vehicle as claimed in claim 1, wherein the control unit is further configured to select the command pattern based on a difference between rotational speeds of an input rotary member and an output rotary member of the engagement device.

3. The hydraulic control system for a vehicle as claimed in claim 1, wherein the control unit is further configured to select the command pattern based on a braking demand and a road gradient.

4. The hydraulic control system for a vehicle as claimed in claim 1, further comprising:
a prime mover that generates a driving force, and a fluid coupling that is connected to the prime mover to deliver the driving force to the engagement device, and
wherein the control unit is further configured to determine a commencement of an engagement of the engagement device based on a fact that an output speed of the fluid coupling is lowered under a condition that the initial pressure is raised to a level of the steady pressure.

5. The hydraulic control system for a vehicle as claimed in claim 4,
wherein the control unit is further configured to increase the engagement pressure of the engagement device continuously in case a commencement of engagement of the engagement device is determined.

6. The hydraulic control system for a vehicle as claimed in claim 1, wherein the engagement device includes a clutch and a brake of a torque reversing device that is adapted to reverse rotational directions of an input shaft and an output shaft.

7. The hydraulic control system for a vehicle as claimed in claim 1, further comprising:
a mechanical oil pump that is driven by a power for propelling the vehicle to discharge oil.

8. The hydraulic control system for a vehicle as claimed in claim 7, further comprising:
an electric oil pump that is driven by a motor to discharge oil and in which a capacity thereof is smaller than that of the mechanical oil pump.

9. The hydraulic control system for a vehicle as claimed in claim 7, further comprising:
a regulator valve that regulates hydraulic pressure in a passage for the oil discharged from the mechanical oil pump; and wherein the initial pressure includes hydraulic pressure in the passage regulated by the regulator valve.

10. The hydraulic control system for a vehicle as claimed in claim 9, wherein the oil discharged from the passage through the regulator valve when the hydraulic pressure in the passage is high is delivered to a low pressure site where a level of a required pressure is lower than a level of the pressure required by the engagement device or the continuously variable transmission.

* * * * *